UNITED STATES PATENT OFFICE 2,590,598

POLYETHERS AND PROCESS OF PREPARING THE SAME

John W. Copenhaver, Easton, Pa., assignor to General Aniline & Film Corporation, New York, N. Y., a corporation of Delaware No Drawing. Application December 7, 1948,
Serial No. 64,039

8 Claims. (Cl. 260—615)

This invention relates to a method of preparing compounds substituted on alternate carbon atoms by ether groups.

I have found that the acetal group of the alkylidene diethers, i. e. polyalkoxy acetals of the type disclosed in U. S. Patent No. 2,165,962 and those disclosed in my copending application S. N. 762,-213, filed July 19, 1947, now Patent No. 2,487,525, issued November 8, 1949, may be reduced to an ether group without affecting the ether groups in 3- or other positions, by treating them with hydrogen in the presence of a metallic hydrogenation catalyst under substantially anhydrous and neutral or alkaline conditions.

The reduction involved in the process of the present invention may be formulated as follows:

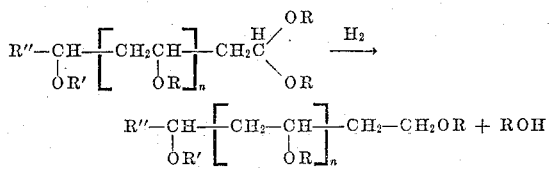

wherein the R's represent the same or different hydrocarbon radicals chosen from the group consisting of alkyl, aryl and aralkyl radicals, and $n$ is a whole number including 0 and generally less than 10.

The detailed operation of the process of the present invention will be apparent to those skilled in the art from a consideration of the following specific examples:

Example I 444 grams (3 mols) of 1,1,3-trimethoxybutane mixed with 20 grams of Raney nickel catalyst were reduced in a shaking autoclave at 180–185° C. and 1800–3900 pounds per square inch hydrogen pressure. After 24 hours 2.84 mols of hydrogen had been absorbed. The bomb was then cooled, the reaction mixture filtered to remove the catalyst and then distilled. After distilling off the methanol the 1,3-dimethoxybutane was obtained in good yield as a water white liquid of pleasant ethereal odor, (B. P. 118–119° C., $n_D^{25}$ 1.3921, $d_4^{25}$ 0.8495).

Analysis calculated for $C_6H_{14}O_2$: C, 60.98; H, 11.94
Found: C, 61.07; H, 12.01

Example II 440 grams (2.5 mols) of 1,1,3-trimethoxyhexane mixed with 20 grams of Raney nickel catalyst were reduced in a shaking autoclave at 190–210° C. for 20 hours at a hydrogen pressure of 1500–1700 pounds per square inch. The bomb was then cooled, discharged and the contents filtered to remove the catalyst. Following filtration, the reaction mixture was distilled and after removing the methanol, 1,3-dimethoxyhexane was recovered in a 52% yield. This material had the following properties:

B. P. 158° C., $n_D^{25}$ 1.4100, $d_4^{25}$ 0.8352.
Analysis calculated for $C_8H_{18}O_2$: C, 65.71; H, 12.40
Found: C, 65.88; H, 12.37

In carrying out the process of the present invention, it has been found that in order to avoid reduction of the ether linkages in 3- and other positions, the presence of acid during the reduction should be avoided. Likewise, in order to avoid a complete reduction of the acetal linkage, the reaction should be carried out under substantially anhydrous conditions.

It has been found that with hydrogen pressures below 1,000 pounds per square inch and at temperatures lower than 175° C., the reaction rate is very slow and therefore, as a practical matter, hydrogen pressures of the order of 3,000 to 4,000 pounds per square inch are preferred and temperatures within the range of 175–220° C. are to be preferred. However, the process is operative at pressures down to, say, 400 pounds per square inch and at temperatures as low as 100° C.

The catalyst to be employed in practicing the present invention may be any metal hydrogenation catalyst. However, Raney nickel catalyst has been found to be satisfactory and is preferred, but other metal hydrogenation catalysts such as noble metal hydrogenation catalyst (i. e. platinum or palladium) or copper, chromium, etc. may be employed, if desired.

As indicated by the equation given above, the present invention is broadly applicable to the reduction of acetals of the type illustrated to produce polyethers having ether groups on alternate carbon atoms. These ethers, as indicated by the general equation given above, have the following formula:

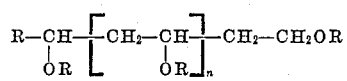

Wherein the R's stand for the same or different hydrocarbon radicals chosen from the group consisting of alkyl, aryl and aralkyl radicals, and $n$ is a whole number including 0 and generally less than 10, and more usually less than 5. As examples of other acetals which may be reduced to 1,3-dialkoxy compounds, i. e. compounds of which $n$ is 0, may be mentioned particularly 1,1,3-tri-lower-alkoxy alkanes such as 1,1,3-triethoxybutane, 1,1,3-triethoxy or trimethoxy-3-phenylpropane, 1,1,3-trimethoxy or triethoxy-4-phenylbutane, and mixed 1,1,3-trialkoxy alkanes such as 1,1-dimethoxy-3-ethoxybutane, 1,3-dimethoxy-1-ethoxybutane, and also compounds in which one or more of the ether groups is aryl or aralkyl such as 1-phenoxy-1,3-dimethoxybutane, 1,1-dimethoxy-3-phenoxybutane, 1,1-dimethoxy-3-benzyloxybutane and the like. In addition numerous higher molecular weight alkylidene diethers, i. e. 1,1,3,5-polyalkoxy alkanes and 1,1,3,5,7-polyalkoxy alkanes and the higher homologues in which alternate carbon atoms have an ether group, may be reduced to ethers of the type indicated, i. e. compounds in which $n$ in the above formula is 1 or higher, usually 1 to 5. As examples of alkylidene diethers and the ethers of this type to which they may be reduced, may be mentioned 1,1,3,5-tetramethoxyhexane (B. P. 83° C./6 mm.; $N_D^{25}$ 1.4179) which may be reduced to 1,3,5-trimethoxyhexane; 1,1,3,5,7-pentamethoxyoctane (B. P. 95° C.1 mm.; $N_D^{25}$ 1.4290) which may be reduced to 1,3,5,7 - tetramethoxyoctane; 1,1,3,5,7,9 - hexamethoxydecane (B. P. 119° C./0.4 mm.; $N_D^{25}$ 1.436) which may be reduced to 1,3,5,7,9-pentamethoxydecane; 1,1,3,5,7,9,11-heptamethoxydodecane (B. P. 148° C./0.4 mm.; $N_D^{25}$ 1.436) which may be reduced to 1,1,3,5,7,9-pentamethoxydecane; 1,1,3,5,7,9,11-heptamethoxydodecane (B. P. 148° C./0.4 mm.; $N_D^{25}$ 1.4435) which may be reduced to 1,1,3,5,7,9,11-methoxydodecane; and the corresponding ethoxy compounds also such compounds as 1,1,3-trimethoxy-5-ethoxyhexane which may be reduced to 1,3-dimethoxy-5-ethoxyhexane; 1,1-dimethoxy - 3,5 - ethoxyhexane which may be reduced to 1-methoxy-3,5-ethoxyhexane; 1,1 - dimethoxy - 3,5,7 - ethoxyoctane which may be reduced to 1-methoxy-3,5,7-ethoxyoctane, etc. Of particular interest for the production of ethers of the type indicated in the above formula and equation in which $n$ is 1 or greater are the mixed higher molecular weight products obtained as described in said Patent 2,165,962 or said application, Serial No. 762,213, by the reaction of an acetal with 2 or more mols of a vinyl ether and consisting of a mixture of acetals of the type described in which $n$ varies from 1 to 5 or higher; i. e. a mixture of compounds of the type mentioned immediately above. As examples of higher molecular weight acetals in which one or more of the groups OR is aryloxy or aralkoxy may be mentioned 1,1,3-triethoxy-5-phenoxyhexane which may be reduced to 1,3-ethoxy-5-phenoxyhexane, 1,1,3-trimethoxy-5-benzyloxyhexane which may be reduced to 1,3-ethoxy-5-benzoylhexane, etc. The thus obtained ethers are relatively non-volatile liquids and are of value as organic solvents or the higher molecular weight products as plasticizers. They are also useful as anti-dusting agents for organic materials such as dyestuff powders and are of interest as transparentizing agents for paper.

I claim:

1. The method of producing polyethers by the reduction of polyoxyacetals of the formula:

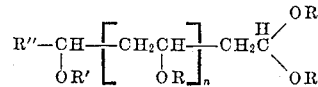

wherein the R's represent the same or different hydrocarbon radicals chosen from the group consisting of alkyl, aryl and aralkyl radicals, and $n$ is a whole number including 0 and less than 10, which comprises subjecting said acetal to the action of hydrogen at a pressure of at least 1,000 pounds per square inch and a temperature of at least 160° C. under substantially anhydrous neutral to alkaline conditions, and in the presence of a metal hydrogenation catalyst.

2. The process as defined in claim 1, wherein the acetal is a lower alkoxy acetal.

3. The process as defined in claim 2, wherein the pressure is within the range of 3,000 to 4,000 pounds per square inch and the temperature within the range of 175–220° C.

4. The process of reducing a 1,1,3-trialkoxy alkane containing at least 4 alkane carbon atoms to the corresponding 1,3-dialkoxy alkane which comprises subjecting the same to the action of hydrogen under substantially anhydrous neutral to alkaline conditions at a pressure of from 3,000 to 4,000 pounds per square inch, a temperature within the range of 175–220° C. and in the presence of a metal hydrogenation catalyst.

5. Compounds of the formula

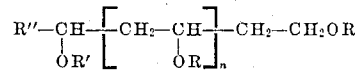

where in the R's represent a member of the group consisting of alkyl, aryl and aralkyl radicals and $n$ is an integer of from 1–5.

6. Compounds as defined in claim 5 wherein R is lower alkyl.

7. 1,3,5-trialkoxy alkanes containing at least 6 alkane carbon atoms.

8. 1,3,5,7-tetraalkoxy alkanes containing at least 8 alkane carbon atoms.

JOHN W. COPENHAVER.

REFERENCES CITED

The following references are of record in the file of this patent:

UNITED STATES PATENTS

| Number | Name | Date |
|---|---|---|
| 2,165,962 | Cunradi et al. | July 11, 1939 |
| 2,425,042 | McNamee et al. | Aug. 5, 1947 |
| 2,487,525 | Copenhaver | Nov. 8, 1949 |